United States Patent Office 3,832,153
Patented Aug. 27, 1974

3,832,153
ADJUSTABLE FORM FOR SHAPING SHEETS OF PLASTIC MATERIAL, IN PARTICULAR, GLASS
Albert Bezombes, Paris, France, assignor to Saint-Gobain Industries, Neuilly-sur-Seine, France
Filed May 15, 1972, Ser. No. 253,273
Claims priority, application France, May 14, 1971, 7117490
Int. Cl. C03b 23/02
U.S. Cl. 65—291         1 Claim

ABSTRACT OF THE DISCLOSURE

An adjustable form for press-shaping sheets of plastic material such as hot glass, and comprising a plurality of straight bars disposed in parallel, side-by-side relation, each mounted individually for translation with respect to the others. Means are provided for unitizing the bars in desired relation wherein their free surfaces conjointly define or determine a surface of desired form or radius of curvature, usable as one of two complementary forms between which the sheet may be shaped.

FIELD OF THE INVENTION

The present invention relates to apparatus for shaping sheets of plastic material, in particular, sheets of glass heated to plasticity. Such apparatus is in general characterized by an upper mold or form which cooperates with a complementarily-shaped lower form to press the horizontally-disposed plastic sheet into the desired shape.

DESCRIPTION OF THE PRIOR ART

It is known, for example, to shape sheets such as glass heated to plasticity, by pressing them between an upper rigid and concave form and a lower complementary convex form having a shape defined by the central curved or arcuate portions of a number of rollers collectively adjustable as a unit about respective spaced parallel axes defined, each by the straight aligned ends of the rollers. It should be explained that the rollers are composed each of a solid or rigid metallic tube having its central portion bent to the desired fixed arcuate shape, and encased in a flexible heat-resistant roller covering which is rotatable on and about the bent or arcuate core.

The rollers are adjustable as aforesaid, in order that their arcuate central portions may collectively define an area of shape having a radius of curvature in transverse planes, varying from a desired minimum when the arcuate central portions lie in respective planes normal to the common plane defined by the parallel axes of adjustment, to infinity when those arcuate portions are coplanar in the common plane. Such an apparatus is disclosed in French Pat. No. 1,476,785, and is well adapted for the production of sheets or panes of cylindrical form or shape such, for instance as the side windows of motor vehicles.

In apparatus of the type shown in the French patent above identified, when it is desired to change the radius of curvature of the sheets being formed, it is necessary to substitute one upper form for another because they are per se rigid and unyielding. On the other hand it is only required to alter the inclination to the common plane, of the arcuate central portions of the lower or transport rollers which collectively constitute the lower forming or shaping means. It is also necessary that the upper rigid forming or shaping means be precisely located with respect to the lower rollers in order to avoid optical imperfections in the finished sheets and their possible breakage.

Further, when as aforesaid the upper mold or shaping means is rigid, it is necessary to provide a number of alternatively usable forms of different radii of curvature. The required substitutions are time consuming and expensive, all the more because the entire equipment of oven, transport means and tempering apparatus must be out of production during change-over. Such apparatus therefore unavoidably detracts from the advantages afforded by the inclinable lower forming rollers.

French Pat. 845,786 shows the use of flexible forms composed of laminae of wood or like material, fixed on flexible bands supported by a frame and capable of being flexed into curved form by the operation of threaded rods.

In French Pat. 847,669 it was proposed to use shaping forms composed of grouped elements movable with respect to one another in a direction generally perpendicular to the sheet to be shaped, and unitized by means compressing them together.

The apparatuses above described have two main disadvantages. The adjustments for the desired shape and form of the completed sheet, are time-consuming and intricate, while because of unavoidable thermal changes during operation, the curve to which the apparatus is initially adjusted, does not remain constant. In particular in roller-type shaping apparatus as previously described, wherein the advancement of the sheet is continuous, temperature gradients are created in the direction of advance, which can result in serious deformations of the finished articles and create undesirable internal stresses therein.

SUMMARY OF THE INVENTION

The present invention obviates the drawbacks in the prior art apparatus as described in the preceding paragraphs, by providing a shaping form composed of a plurality of elements or bars each of which is individually adjustable in a first direction normal to the sheet being shaped and are capable of being fixedly related or unitized by tightening means readily accessible and effective in a second direction perpendicular to the first direction. The form is conjointly defined by the free side surfaces of a plurality of elongated elements or bars which are essentially parallel and horizontal, and connected together by resilient bands having a flexibility sufficient to permit deformation of the defined surface by the action of the weight of the bars themselves when free for vertical movement. The bars are adjustable relatively to one another so that their free bottom sides or surfaces conjointly define any one of a number of desired curved shapes. The area or surface thus defined can be maintained indefinitely by means binding the bars together, such as threaded rods.

A second desirable feature of the invention enables the rods having exposed lower surfaces conjointly defining a shaping mold or form, to have freedom to expand in the direction of their lengths, in order to compensate for temperature variations.

In accordance with another feature of the invention each of the bars is mounted by a double linkage or articulation to its support, the axes of articulation being parallel to the bars. A non-limiting example of one embodiment is shown in the accompanying drawing.

DESCRIPTION OF THE PREFERRED EMBODIMENT

The bars 1 conjointly defining a shaping surface are, as shown, disposed in side-by-side relation and are interconnected by bands 2 of stainless steel attached thereto. The bands are sufficiently flexible so as to be readily deformed by the weight of the bars. They can thus assume positions in each case, determined by the contour or shape conjointly defined by a plurality of lower curved shaping rollers 11.

Figure 3:
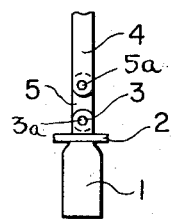
FIG. 3 is an elevation showing details of one of the double articulations by which each bar is connected with its mounting means.

Notched lugs 3 are secured to bands 2 at regular intervals therealong. One end of a respective link 5 fits within the notch of each lug and is, as shown, pivoted thereto by a pivot 3a, FIG. 3. The other or upper end of each link is pivoted as at 5a, FIG. 3, to the forked lower end of a respective one of a plurality of slides 4. Each of the slides 4 with its links 5 may be regarded as a suspensory element for one of the bars. In the manner obvious from FIG. 4, the double articulation thus provided for each bar, enables variation in the angle between the plane of its lower face and the longitudinal or vertical axis of its slide 4. The double articulation promotes efficient operation of the apparatus and avoids warping or parasitic friction which would otherwise oppose the free movement of the bars when they are released from their unitizing or rigidifying mechanism. The construction, under those conditions of release, also enables free flexure of bands 2 and thus prevents undesired distortion of the shape conjointly determined by bars 1 under temperature or other dilations of the linkage.

Figure 1:
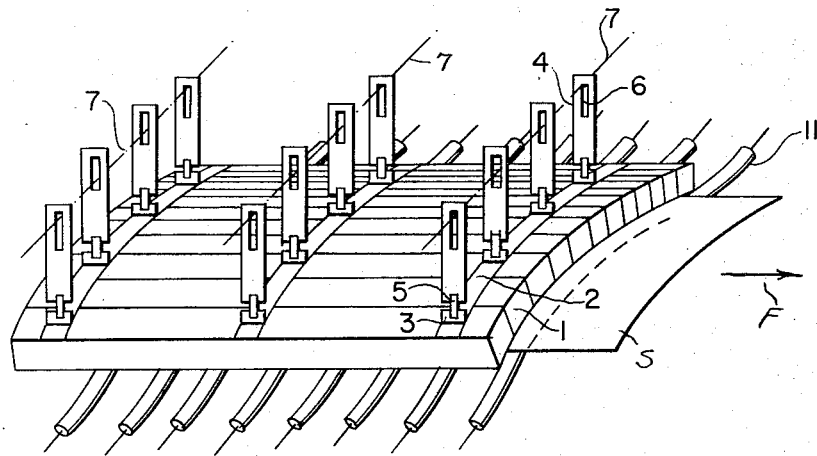
FIG. 1 is a perspective view showing the invention in association with its underlying complementary shaping form such as curved rollers.

In order to provide for the rapid change when desired, of the shape defined by bars 1, each slide 4 is slotted at its upper end as indicated at 6. As is clear from FIGS. 2 and 4 each slot extends in the vertical or longitudinal direction of its slide. The slots, when the unitizing means is released, enable the vertical adjustment or movement of the slides, under the action of the weight of the bars connected thereto. FIG. 1 shows that a series of slides 4 and their double articulation connection to a corresponding band 2, are disposed along a respective one of a number of rods 7 shown as generally horizontal and parallel. The rods are spaced along the direction of movement of the sheet S being shaped, as indicated by arrow F.

As is clear from FIGS. 1 and 4, each rod 7 passes through the slots of a respective series of slides 4, and is mounted at its ends on supporting beams 9 as subsequently described. See FIG. 4. There is one band 2 for each of the aforesaid series of linkages. Although for clarity of disclosure, a number of links and linkages are omitted from FIG. 1, it will be understood that, as in FIG. 4, each slide 4 of a series is linked to a corresponding one of the lugs 3 therebelow, and its attached bar 1.

The links of a series are separated by a number of spacer sleeves 8 through which rods 7 pass. Each sleeve is interposed between a consecutive pair of slides.

Figure 2:
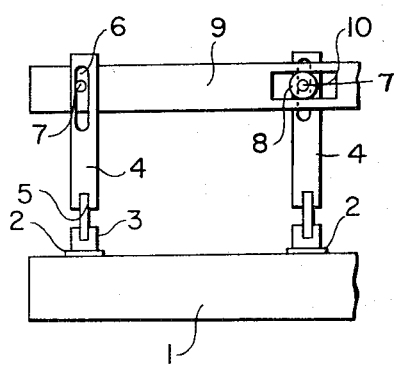
FIG. 2 is an elevation of one end of one bar and its adjustable connection to its mounting or support.
Figure 4:
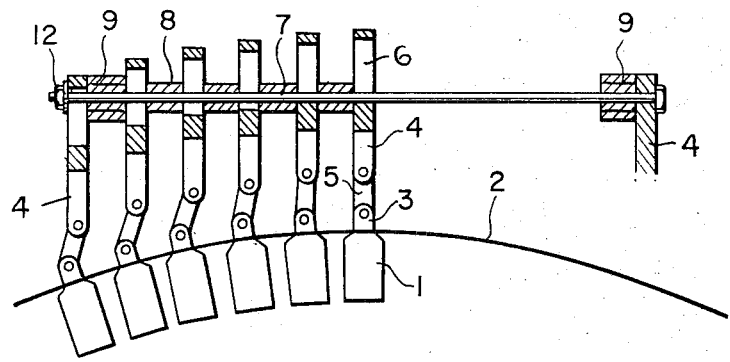
FIG. 4 is an elevation partly in section and taken in a plane at right angles to that of FIG. 2, to show how the surfaces of the bars conjointly form or define a curved shaping surface.

As previously noted the assembly thus described is supported by and from a pair of beams 9 which as shown upon FIGS. 2 and 4, extend parallel with bars 1 and the direction of translation of sheet S, at respective sides of the sheet. As shown at the left of FIG. 2, one series of slides only is fixed against movement in the direction parallel to beams 9, by reason of its binding rod 7 passing through and fitting a hole in the beams. The remaining slides of each series can move as a unit longitudinally with respect to the beams, by reason of slots 10 in each beam and in which one of the spacer sleeves 8 has a smooth sliding fit. In this manner variations in length of bars 1 due to thermal expansion and contraction are accommodated without setting up stresses in the bars, beams, and their interconnecting linkages. As shown upon FIG. 4 each beam 9 extends between the first and second slides at that side.

The slides of each series can be unitized by tightening a nut 12 threaded on one end of each respective rod 7. The construction is such that tightening of nuts 12 does not bind the first and second slides at each side, to the contiguous beam 9. This may be accomplished in a known way by projections of reduced diameter extending axially from those sleeves passing through slots 10 in the beams so that the slides of those series are unitized when the nuts are tightened, but still permitted free movement as a unit in and along the respective slots 10.

Bars 1 are preferably of graphite to thus assure a good distribution of heat throughout the form they conjointly define, and to facilitate thermal exchange with the sheet being shaped. They are secured to bands 2 to have just enough play to enable their maximum necessary transverse movement due to heat expansion of the bars 1 extending along each respective side edge of sheet S. Slots 6 are of a length and location so as to enable each bar 1 to move vertically to accommodate the maximum change in vertical position of the underlying arcuate portion of rollers 11. The bars may be heated as by electrical resistance heating means incorporated in each.

OPERATION

The adjustment of the bars to define a desired shaped or forming surface is very simple. As previously indicated, curved rollers 11 are pivotable as a unit about the respective axes defined by the straight aligned ends thereof, so that the curved or arcuate central portions of the rollers conjointly define a curved area of the desired radius of curvature. When the rollers have been pivoted to the desired angle, a model having the corresponding shape of the finished sheet, is placed over the aforesaid central portions, to rest thereon. The model is conveniently of sheet metal.

Then the assembly of the invention is lowered over the model in proper cooperative relation therewith. Nuts 12 are loosened and each bar 1 moves downwardly under its own weight until it makes full area or line contact with the underlying portion of the model. Then the nuts are tightened to thereby unitize the bars and maintain them in a shape wherein they conjointly conform to the model. Thereafter the unitized bars are elevated, the model removed, and continuous production of a transversely curved sheet S may be started.

Thus the adjustment of the invention to a model of desired curvature is facile and rapid. Further adjustments may be made frequently as may be required to perfect the shape or form defined by the bars, or to effect changeover from one curvature of finished product to another.

While the invention has been described as being used in connection with a lower shaping means consisting of a number of curved rollers 11, each pivotable about its own axis defined by its aligned straight ends, so that the curved or arcuate central portions of the rollers conjointly define a surface of selected radius of curvature in vertical planes through the axes of the rollers, it will be understood that it is equally useful in conjunction with a number of rigid lower molds or forms each of which has a selected radius of curvature different from the others and which are used substitutionally.

What is claimed is:

1. An adjustable form for shaping a sheet of plastic material, said form comprising a plurality of substantially parallel bars and at least two sets of suspensory elements for said bars, each of said sets including a rod and a flexible band affixed to all of said bars and extending substantially perpendicular to said bars, each said rod and band being disposed in substantially parallel relation, each said set further including for each of said bars a slotted slide engaged at its slot on said rod, a link pivotally connected to said slide for rotation with respect thereto about an axis substantially parallel to said bars, a lug pivotally connecting said link to said bar for rotation with respect thereto about an axis substantially parallel to said bars, a sleeve engaged on each said rod between the slides of each pair of adjacent slides engaged on said rod, and means to place in compression on said rod the slides and sleeves thereon, whereby said slides may be held in fixed spaced parallel relation, said form further comprising a frame including beams supporting said rods in spaced parallel relation.

References Cited

UNITED STATES PATENTS

| | | | |
|---|---|---|---|
| 2,372,418 | 3/1945 | Forbes et al. | 65—287 |
| 3,469,963 | 9/1969 | Beattie | 65—356 X |
| 3,387,333 | 6/1968 | Irvine et al. | 425—404 |

FOREIGN PATENTS

| | | | |
|---|---|---|---|
| 845,786 | 5/1939 | France | 65—273 |

ARTHUR D. KELLOGG, Primary Examiner

U.S. Cl. X.R.

65—273, 275